(12) United States Patent
Vala

(10) Patent No.: US 7,243,980 B2
(45) Date of Patent: Jul. 17, 2007

(54) VEHICLE DRAG REDUCTION APPARATUS

(76) Inventor: Philip Vala, 168 Antigua, Mississauga, Ontario (CA) L5B 2T6

( * ) Notice: Subject to any disclaimer, the term of this patent is extended or adjusted under 35 U.S.C. 154(b) by 8 days.

(21) Appl. No.: 11/195,599

(22) Filed: Aug. 3, 2005

(65) Prior Publication Data

US 2007/0029837 A1 Feb. 8, 2007

(51) Int. Cl.
*B62D 35/00* (2006.01)
(52) U.S. Cl. .................. 296/180.4; 296/180.1
(58) Field of Classification Search ............ 296/180.1, 296/180.4, 180.5, 189.03; 135/119
See application file for complete search history.

(56) References Cited

U.S. PATENT DOCUMENTS

| | | | | |
|---|---|---|---|---|
| 3,669,133 A | * | 6/1972 | Hyman | 135/74 |
| 3,834,410 A | * | 9/1974 | Leibel | 135/123 |
| 3,866,967 A | * | 2/1975 | Landry et al. | 296/180.4 |
| 3,934,922 A | | 1/1976 | MacCready, Jr. et al. | |
| 3,960,402 A | | 6/1976 | Keck | |
| 4,142,755 A | * | 3/1979 | Keedy | 296/180.2 |
| 4,214,787 A | | 7/1980 | Chain | |
| 4,236,745 A | * | 12/1980 | Davis | 296/180.4 |
| 4,257,641 A | | 3/1981 | Keedy | |
| 4,309,053 A | | 1/1982 | Lett | |
| 4,311,334 A | * | 1/1982 | Jenkins | 296/180.4 |
| 4,320,920 A | | 3/1982 | Goudey | |
| 4,352,362 A | * | 10/1982 | Nichols | 135/98 |
| 4,433,865 A | | 2/1984 | Crompton, Jr. | |
| 4,451,074 A | | 5/1984 | Scanlon | |
| 4,458,936 A | | 7/1984 | Mulholland | |
| 4,508,380 A | | 4/1985 | Sankrithi | |
| 4,601,508 A | | 7/1986 | Kerian | |
| 4,682,808 A | | 7/1987 | Bilanin | |
| 4,688,841 A | | 8/1987 | Moore | |
| 4,702,509 A | * | 10/1987 | Elliott, Sr | 296/180.4 |
| 4,741,569 A | | 5/1988 | Sutphen | |
| 4,818,015 A | | 4/1989 | Scanlon | |
| 4,978,162 A | | 12/1990 | Labbe | |
| 5,058,945 A | * | 10/1991 | Elliott et al. | 296/180.5 |
| 5,108,145 A | | 4/1992 | Harris | |
| 5,171,057 A | | 12/1992 | Sharp | |
| 5,190,342 A | | 3/1993 | Marlowe et al. | |
| 5,236,347 A | | 8/1993 | Andrus | |
| 5,240,306 A | | 8/1993 | Flemming | |
| 5,280,990 A | | 1/1994 | Rinard | |
| 5,332,280 A | * | 7/1994 | DuPont et al. | 296/180.1 |
| 5,348,366 A | | 9/1994 | Baker et al. | |
| 5,498,059 A | | 3/1996 | Switlik | |
| 5,584,311 A | * | 12/1996 | Schaefer | 135/128 |
| 5,823,610 A | | 10/1998 | Ryan et al. | |
| 5,842,734 A | | 12/1998 | Lechner | |
| 5,947,548 A | | 9/1999 | Carper et al. | |
| 6,092,861 A | | 7/2000 | Whelan | |

(Continued)

*Primary Examiner*—Dennis H. Pedder
*Assistant Examiner*—Michael Hernandez
(74) *Attorney, Agent, or Firm*—Gowan Intellectual Property

(57) ABSTRACT

A vehicle air drag reduction system is provided for mounting on the rearward facing surface of a vehicle, and in particular a truck trailer, that provides improved efficiency. The system comprises a flexible panel that will assume a cone-shape at the rearward end of the trailer, and which is held in place by a plurality of support rods fitted within the flexible panel, and which attach to brackets mounted on said trailer. An inexpensive and simple air drag reduction system is provided which is easily attached or removed from a vehicle is provided.

21 Claims, 5 Drawing Sheets

U.S. PATENT DOCUMENTS

| | | |
|---|---|---|
| 6,257,654 B1 | 7/2001 | Boivin et al. |
| 6,286,892 B1 | 9/2001 | Bauer et al. |
| 6,286,894 B1 | 9/2001 | Kingham |
| 6,309,010 B1 | 10/2001 | Whitten |
| 6,409,252 B1 | 6/2002 | Andrus |
| 6,457,766 B1 * | 10/2002 | Telnack .................... 296/180.4 |
| 6,467,833 B1 | 10/2002 | Travers |
| 6,485,087 B1 | 11/2002 | Roberge et al. |
| 6,595,578 B1 | 7/2003 | Calsoyds et al. |
| 6,616,218 B2 | 9/2003 | Bauer et al. |
| 6,666,498 B1 | 12/2003 | Whitten |
| 6,685,256 B1 | 2/2004 | Shermer |
| 6,742,616 B2 | 6/2004 | Leban |
| 6,779,834 B1 | 8/2004 | Keller |
| 6,789,839 B1 | 9/2004 | Samuelson |
| 6,799,791 B2 | 10/2004 | Reiman et al. |
| 6,854,788 B1 | 2/2005 | Graham |
| 6,877,793 B2 | 4/2005 | Cory |

* cited by examiner

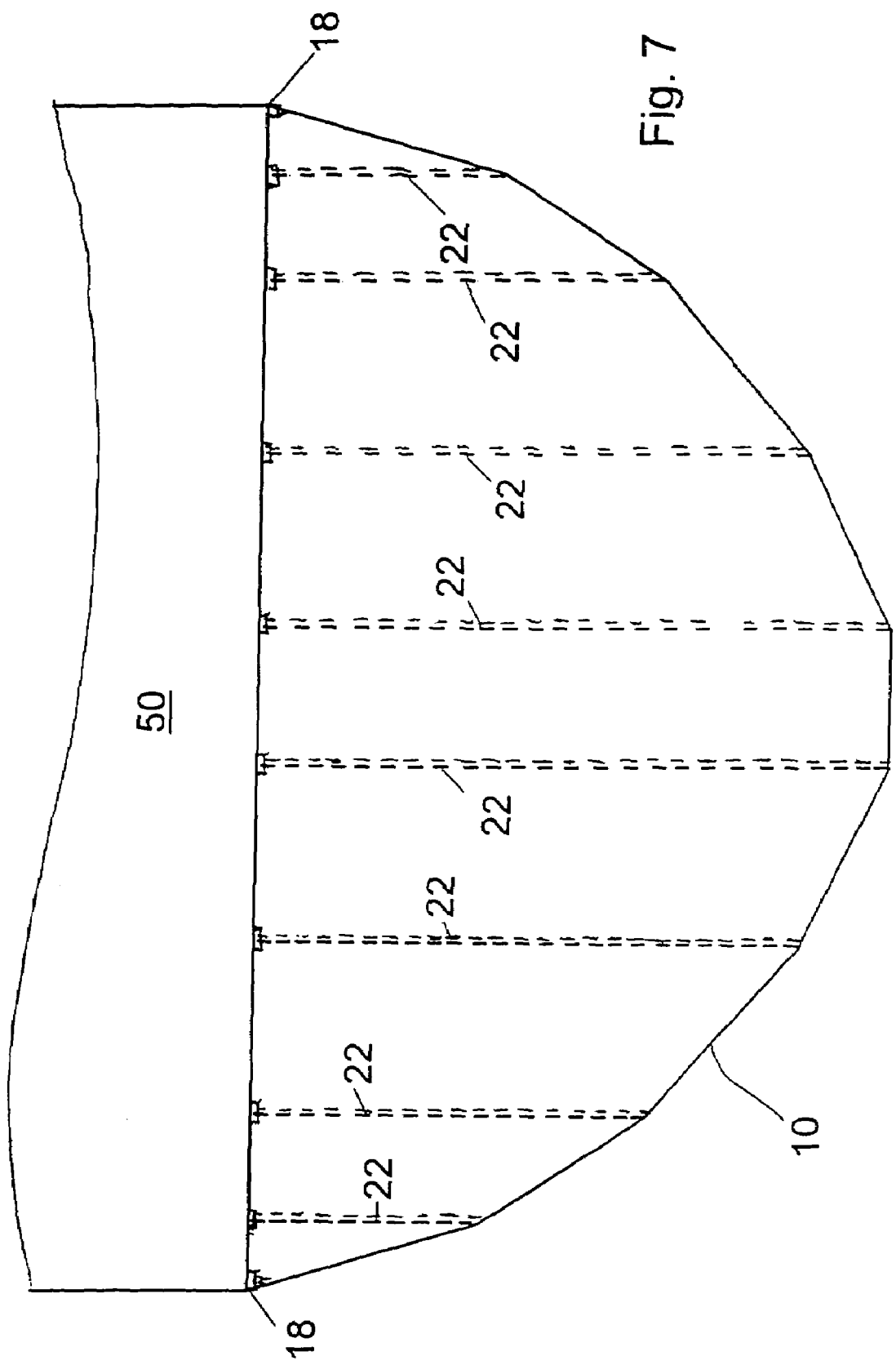

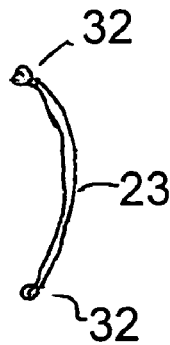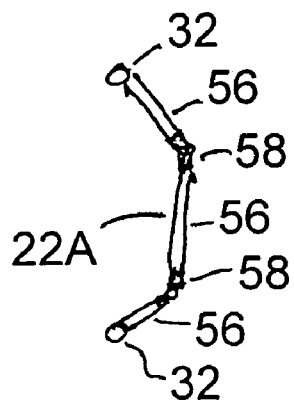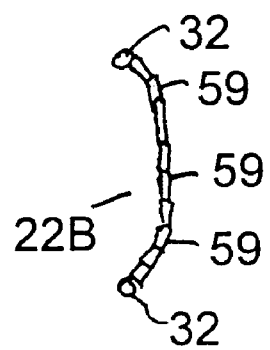
Fig. 8  Fig. 9  Fig. 10
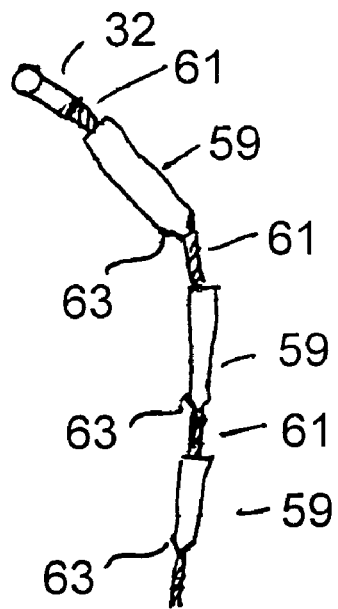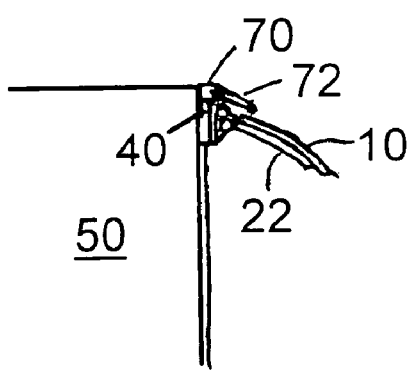
Fig. 11  Fig. 12

VEHICLE DRAG REDUCTION APPARATUS

FIELD OF THE INVENTION

This invention relates to a device, and system, for air drag reduction on vehicles. In particular, this invention relates to such a device which may be easily mounted and dismounted to and from a vehicle. Moreover, the vehicle drag reduction apparatus and system of the present invention is such that when mounted to the rear surface of a vehicle, it may be easily collapsed from its working configuration to a folded, storage configuration, so as to allow easy access to the rear surface of the vehicle.

BACKGROUND OF THE INVENTION

It is well known that the box-like shape of truck storage areas, and the trailer sections of a tractor-trailer combination, results from the need or desire to optimize cargo space. It is also well known that this boxlike configuration is not aerodynamically efficient and that the aerodynamic drag resulting from the box shape accounts for a considerable percentage of the fuel consumption of large trucks and tractor-trailer combinations during higher speed applications, such as on a highway. In an effort to improve the operating efficiency of such vehicles, the tops of the cabs of trucks and tractors and the upper forward ends of trailers have been provided with a wide variety of wind-foil or other wind fairing devices.

For the same purposes, numerous suggestions have been made to modify the rear ends of trucks and trailers in order to provide them with a variety of streamlining and/or drag reducing devices. However, while the devices fitted to the front of the truck and/or trailers can be rigid and permanent in character (in that the areas on which the air foils are mounted do not need to be accessed in connection with use or operation of the vehicle), the rear ends of trucks and trailers typically must be accessible in that the doors to close the rear end of the truck or trailer are located therein. These doors are typically large in nature, and cover most of the rear end of the truck or trailer since they provide access to the cargo area of the truck or trailer, and are used for loading and unloading purposes.

Accordingly, streamlining and drag reducing devices designed for use on the rear ends of trucks and trailers either have to be detachable or designed so that they can be temporarily removed, or moved to a position wherein access to the truck or trailer interior is possible.

However, in the prior art devices, removal and storage of the streamlining devices is typically a time-consuming operation. Also, removal of the devices also requires storage space on the truck if the operator wishes to keep possession of the device in the situation where a trailer is left at a location. Further, permanent mounting of the device on the truck or trailer doors undesirably exposes the device to adverse weather and other conditions during times of non-use of the device. The exposed device is also subject to other potential damage, such as acts of vandalism, or the like. It will be easily appreciated that such exposure and potential damage shortens the life of the device.

For example, in U.S. Pat. No. 5,058,945, a long-haul vehicle streamlining apparatus is provided which has an attachment belt fitted around the outside of the trailer. The belt is drawn tight to the trailer by a series of hooks and straps, and a roughly cone-shaped streamlining device is connected to the belt. The streamlining device has a series of supporting battens or support rods, and is held together in the middle of the device by a strap. For loading or unloading, the streamlining device is separated to provide access to the trailer doors.

While this device provides some improvement over prior art devices, it requires a series of belts and gaskets to seal to the trailer, and can be difficult to use when access to the interior of the truck or trailer is desired. For example, belts must be removed to divide the cone-shaped device, and the separated fabric portions must be draped out of the way in order to access the trailer interior.

Alternatively, the entire device can be removed from the trailer by removal of the attachment belt. However, the entire device is not easily removed (or re-installed) from the trailer, and is not readily portable once removed. Also, the entire device is not easily stored due to the bulk of the belt assembly, and because of the collection of crossing support battens and rods.

Other devices have similar drawbacks. As a result, few of these designs have been adopted to any significant extent. Thus, providing a vehicle air drag reduction apparatus or system which is easier to install or remove, or which provides improved access to the cargo space of a truck or trailer is still desired. As a result, it would still be advantageous to provide a vehicle air drag reduction apparatus that minimized or eliminated some or all of the disadvantages of the prior art devices.

SUMMARY OF THE INVENTION

The advantages set out hereinabove, as well as other objects and goals inherent thereto, are at least partially or fully provided by the vehicle air drag reduction system of the present invention, as set out herein below.

Accordingly, it is a principal advantage of the present invention to provide a vehicle air drag reduction system, to be fitted to a rear substantially flat surface of a vehicle, which comprises a flexible panel having at least three, preferably straight, support rod passages, which panel is adapted to be affixed to the vehicle. The support rod passages are preferably essentially parallel, and are each adapted to receive a support rods which extends through the passage so as to provide structural support for the flexible panel.

At each end of the support rods are fittings which are adapted to be fixed to a support rod receiver. A series of support rod receivers or brackets are temporarily or permanently affixed to the rear end of the trailer; either on the substantially flat surface of the vehicle, or on a side, top or bottom surface of the trailer, operatively adjacent to the flat surface. Preferably, the receivers or brackets are located at or near the top and bottom edges of the trailer flat surface.

Accordingly, in one aspect, the present invention provides a vehicle air drag reduction system for mounting on the rearward surface of a vehicle, wherein said rearward surface of said vehicle on which said system is to be mounted, is substantially flat and rectangular, with opposed vertically disposed side edges and opposed horizontally disposed upper and lower edges;

said vehicle air drag reduction system comprising:

a flexible panel to be affixed to said rearward surface, and extending, in use, essentially between said disposed side edges and essentially between said upper and lower edges, and having two exterior support rod passages, and at least one interior support rod passage positioned between said exterior support rod passages, all of which support rod passages extend from one edge of said flexible panel to an opposite edge thereof;

two exterior support rods and at least one interior support rod, each of which are positioned substantially within said exterior or interior support rod passages respectively, so as to provide structural support for the flexible panel, and each having a support rod end fitting extending out of said support rod passages at each end of said support rod passage;

a series of support rod brackets affixed to said vehicle in a substantially linear fashion on opposing edges of said vehicle, and corresponding alignment with said support rod passages, into which brackets said support rod ends are fitted;

and wherein said interior support rods are longer in length than said exterior support rods such that said interior support rods, and thus said flexible panel, are bowed, in use, to form a cone-shaped panel.

In a further aspect, the present invention also provides a flexible panel for use in the vehicle air reductions system of the present invention, which is to be mounted on the rearward surface of a vehicle, wherein said rearward surface of said vehicle on which said system is to be mounted, is substantially flat and rectangular, with opposed vertically disposed side edges and opposed horizontally disposed upper and lower edges;

said flexible panel structure is adapted to be affixed to said rearward surface, and extending, in use, essentially between said disposed side edges and essentially between said upper and lower edges, and comprising a flexible panel;

two exterior support rod passages at or near the sides of said flexible panel, and at least one interior support rod passage positioned between said exterior support rod passages, all of which support rod passages extend from one edge of said flexible panel to an opposite edge thereof;

two exterior support rods, and at least one interior support rod, each of which are positioned substantially within said exterior or interior support rod passages respectively, so as to provide structural support for the flexible panel, and each having a support rod end fitting extending out of said support rod passages at each end of said support rod passage;

and wherein said interior support rods are longer in length than said exterior support rods.

BRIEF DESCRIPTION OF THE DRAWINGS

Embodiments of this invention will now be described by way of example only in association with the accompanying drawings in which:

FIG. 7 is a top view of the system shown in FIG. 4;

FIG. 8 is a side view of one type of support rod;

FIGS. 9 and 10 are variations on the design of the support rods;

FIG. 11 is an enlarged view of one preferred support rod design; and

FIG. 12 a side view of a flexible panel fitted on a trailer and having a protective flap.

DETAILED DESCRIPTION OF THE PREFERRED EMBODIMENTS

Figure 1:
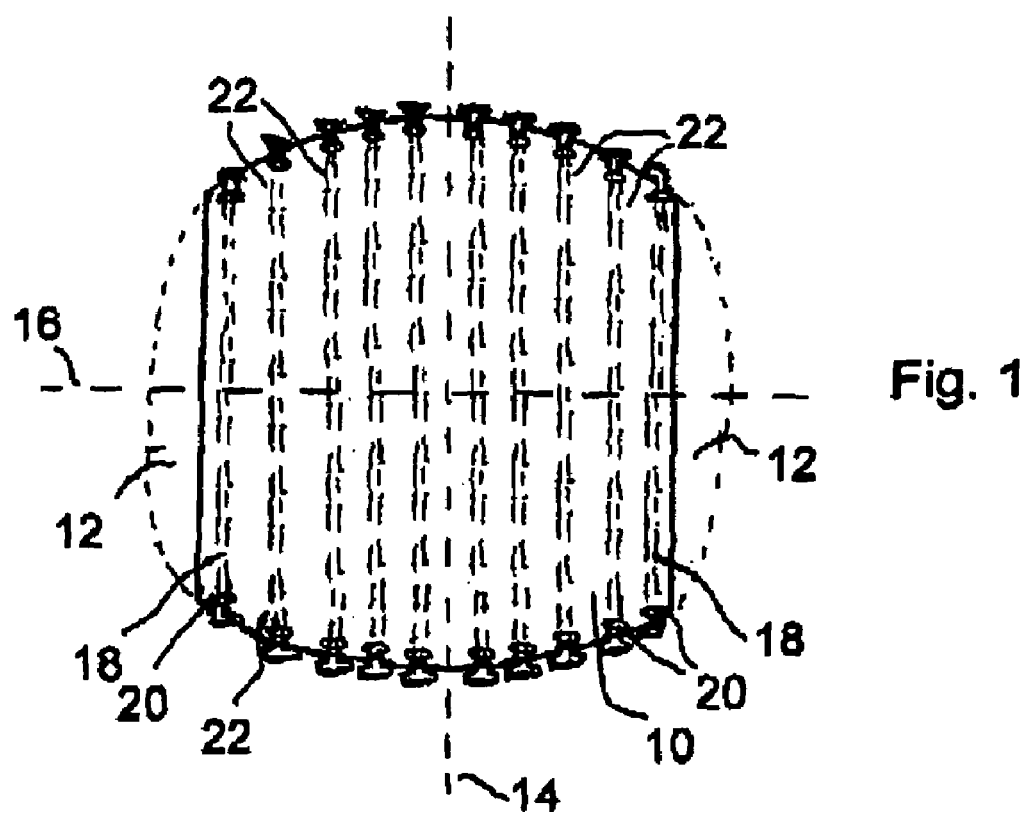
FIG. 1 is a front planar view of the flexible panel of the present invention.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention.

It is to be noted however, that while a truck trailer assembly is shown in the drawings, the vehicle drag reduction system and apparatus of the present application may be mounted on the rearward surface of any suitable vehicle which may typically be one of the following, namely: trucks, trailers, buses, motorized recreational vehicles, recreational trailers, cargo trailers, transport trailers, cube vans, vans, mini-vans, and the like. The system and apparatus might also be mounted for use on containers, piggyback truck trailers, trains, or the like.

Also, for brevity, the invention will hereinafter be described with respect to its application on a truck trailer, or more simply stated, as a trailer. Thus, while the present application is hereinafter described with particular reference to a "trailer", the skilled artisan would be aware that the present application is equally applicable in other applications, such as those listed hereinabove.

Referring to FIG. 1, a flexible panel 10 of the type used in the present invention is shown. Panel 10 is made of any suitable material which will provide the necessary properties including sufficient flexibility to be fitted in place, and sufficient strength to be used on trailers traveling at highway speeds. Also, the flexible panel should preferably be able to withstand the effects of environmental conditions such as prolonged exposure to sunlight, rain, snow or the like. Accordingly, preferably, panel 10 is constructed of a material such as canvas, but other materials such as sheet of plastic such as PVC, nylon or the like, or a tarp woven from fibres from materials such as cotton, plastic, polyester, nylon, or the like, or combinations thereof and therebetween, might also be used.

Panel 10 has a generally circular appearance, but may also be a truncated circle in that side areas 12 might be omitted. Panel 10 is preferably symmetrical around a vertical axis 14, and also, is preferably symmetrical around a horizontal axis 16. For a typical trailer application, panel 10 is preferably oval shaped (or truncated oval shaped) with a vertical axis of roughly 5 metres, and a horizontal axis of 4 metres. These dimensions will result in a flexible panel cone section that extends or bows, in use, approximately 1.5 to 2 metres from the back of the rearward facing surface of the trailer. However, these dimensions can be modified depending on the expected application.

At, or near, each side of panel 10 are exterior support rods 18, which are fitted within enclosed support rod passageways, or slots 20, in panel 10. Between exterior support rods 18 are 8 interior support rods 22. Any number of interior support rods can be used depending on the particular application. Preferably, however, the number of interior support rods is between 1 and 16, more preferably between 2 and 10, and most preferably between 4 and 8.

Also, preferably, exterior and interior support rods 18 and 22 are all essentially parallel, and have varying length such that exterior support rods 18 are the shortest of all of the support rods. The length of interior support rods 22 is greater than the length of exterior rod 18, and increases as one moves towards vertical axis 14. For panel 10, the exterior rods are 2.5 metres, while the longest of the interior rods is 5 metres.

The support rods, and in particular, exterior support rods 18, can be fashioned so as to include a slight curved shape but are preferably normally straight when not in use. The longer, interior support rods might also be slightly curved prior to use, but preferably are also straight when not in use, but are curved, or bowed, when bent into shape for use. It is to be noted that, in general, for a one-piece support rod, a straight support rod is more preferred since it can be more easily stored, as will be described hereinbelow.

Exterior and interior support rods 18 and 22 are preferably resiliently flexible so as to assist in holding them in place on the trailer by their resilient nature.

The exterior support rods 18 are preferably essentially the same length as the height of the trailer 50. Accordingly, in use, exterior support rods 18 will be bent only a sufficient amount that they are maintained in position when used on the trailer, due to their resilient nature. However, they are preferably not excessively longer than the trailer height, or the distance between their mounting brackets, in order to avoid excessive bending at the side of the trailer.

Further, the exterior support rods are preferably of a length that allows them to be in substantive contact with trailer 50 at or near the side edges of the trailer flat surface area. This assists in reducing or eliminating air flow between the trailer and the inside of the flexible panel.

Additionally, having the side support rods abutting the edge of the trailer provides additional security to prevent access to the trailer doors when the trailer is parked.

The length of the exterior support rods can vary widely depending on the size of the trailer, or depending on the intended application. Typically, however, the exterior support rods preferably have a length of between 1 and 5 metres, and more preferably between 1.5 and 4 metres.

Interior support rods 22 are thus typically longer than the height of the trailer, for this application, and increase in length as one moves from the exterior support rods towards the centre axis of the flexible panel. Again, however, the length of the interior support rods can also vary widely depending on the size of the trailer, or depending on the intended application. Typically, however, the interior support rods preferably have a length of between 1.6 and 8 metres, and more preferably, between 2 and 5 metres.

Support rods 18 and 22 may be made of various materials depending on the desired ability to bend. Also, different lengths of support rods might be constructed of different materials in order to provide the desired levels of strength and/or flexibility. For example, exterior support rods might be made of a stronger material such as metal, including steel or aluminum, or a heavy gauge plastic material in order to assist in maintaining a solid rigid edge at the outer side edge of panel 10. Interior support rods 22 might be made of thinner gauge metal or plastic materials, such as graphite, fibreglass or carbon fibre, or extruded plastics such as polyethylene or polypropylene, or the like. The support rods may be solid, hollow, or have any other suitable shape, such as a mesh shape, or the like. Also, combinations of materials might also be used.

As shown in FIG. 1, and subsequent figures, the support rods, in use, are preferably positioned so as to be vertically orientated to the ground. This allows a trailer operator to connect the top of a support rod to the upper edge of the rearward face of the trailer unit, and then connect the lower end of the support rod to the lower edge of the trailer unit. As such, the operator can connect both ends of the support rod without needing any type of ladder, or the like, which might be necessary for attaching the rods to the higher brackets if a horizontal orientation were employed.

Figure 2A:
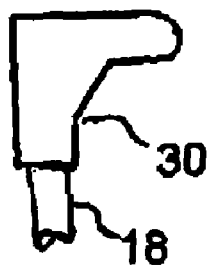
FIGS. 2A, 2B, 2C and 2D are views of fittings on the ends of the support rods, and suitable receivers or brackets adapted to receive the fittings.
Figure 2B:
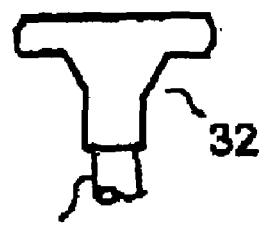

At each end of support rods 18 and 22 are fittings that are used to hold the support rod in place. The fittings are connected to the support rods using any suitable attachment method. Also, while the fittings on all support rods might be identical, in a preferred embodiment, exterior support rods 18 are fitted with a corner ferrule end 30, and interior support rods 22 are fitted with a straight ferrule end 32, as shown in FIGS. 2A and 2B.

Figure 2C:
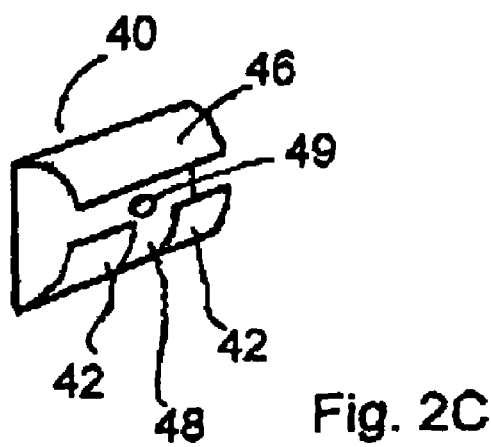

Straight ferrule end 32 is adapted to be positioned in a corresponding bracket 40 shown in FIG. 2C. Bracket 40 has a gap 48 between two tabs 42 into which ferrule 32 is fitted. A brace 46 is also provided on the other side of bracket 40, and the support rod 22 can be positioned within gap 48 with a straight through portion of ferrule 32 being positioned within bracket 40. Under tension of the bending of support rod 22, ferrule 32 is pressed against brace 46 which brace has a curved shape that prevents ferrule 32 from being pushed out of bracket 40.

Figure 2D:
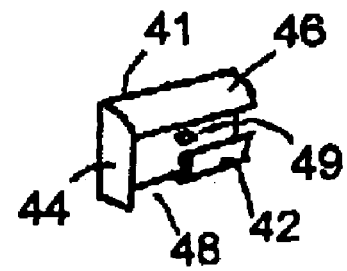

For end support rods 18, a corresponding end bracket 41 is shown in FIG. 2D. Bracket 41 is adapted to receive the corner ferrule end 30 fitted to the end of exterior support rods 18. End bracket 41 has a closed end 44 and a single tab 42 which defines gap 48 in bracket 41. It also has a curved brace 46, which acts in the same fashion as in bracket 40.

Brackets 40 and 41 are adapted to be bolted to a trailer using hole 49. However, it should be noted that the brackets can be temporarily or permanently affixed to the trailer using any of a number of different methods including bolts, screws, cotter pins, welds, rivets, glue, or the like. Further, a series of brackets 40 and 41 might be affixed to a common bracket panel (not shown) and the bracket panel can then be affixed to the trailer.

Figure 3:
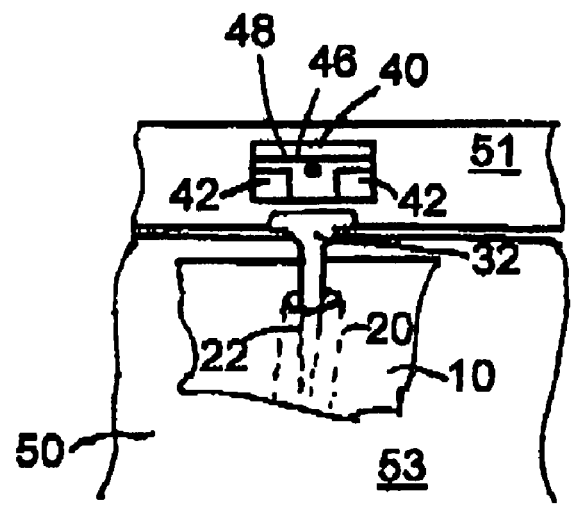
FIG. 3 is an enlarged cut-a-away view of an end portion of a support rod which is in position to be fitted to a bracket located on a trailer.

In FIG. 3, a bracket 40 is shown attached to the upper edge of the rearward face of a trailer 50, into which an interior support rod 22 is to be positioned. Bracket 40 is mounted on the supporting edge 51 of the rearward face of trailer 50, and is thus, located above the doors 53 of trailer 50. The straight portion of ferrule 32 is positioned to be placed within bracket 40 so that it passes over tabs 42, and under brace 46. Support rod 22 is thus positioned within gap 48. When support rod 22 is bent, it presses against brace 46.

Figure 4:
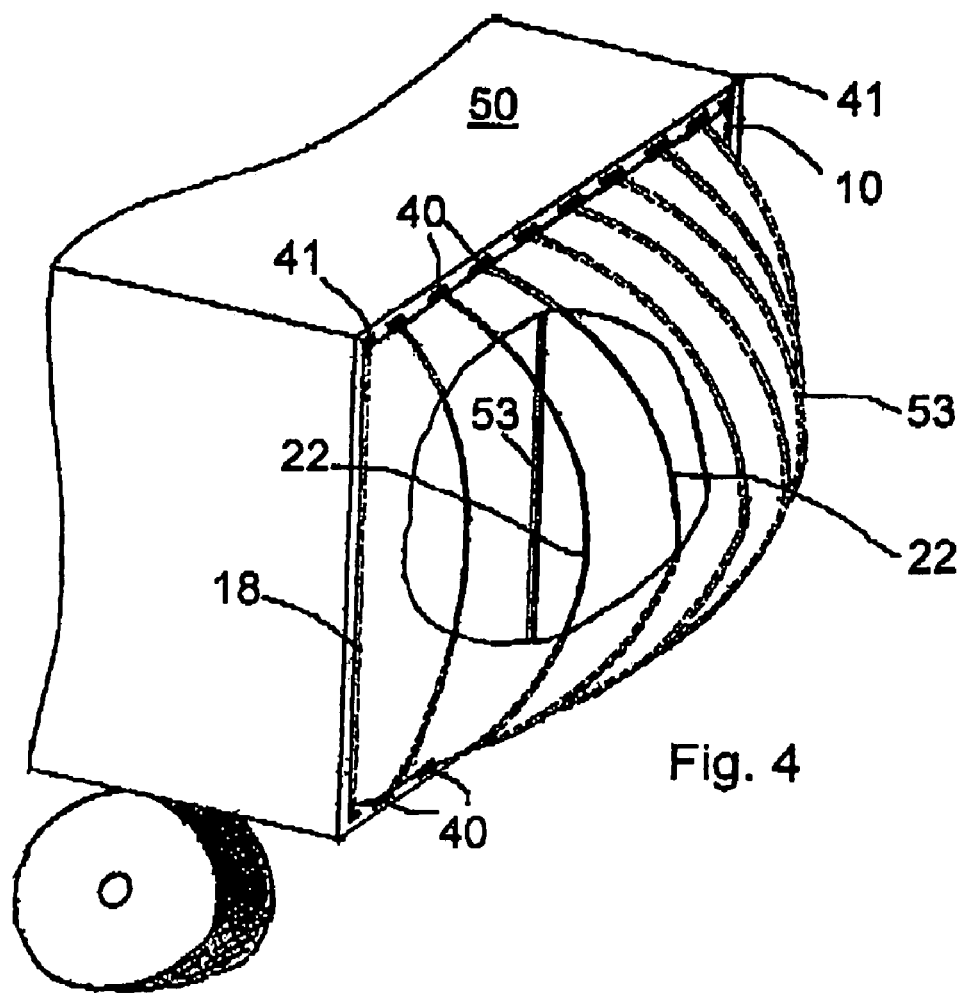
FIG. 4 is a cutaway perspective view of the system of the present invention, fitted to a truck trailer.

In use, brackets 40 and 41 are preferably positioned in an essentially linear fashion at the upper and lower edges of the rearward face of a trailer unit 50, as shown in FIG. 4.

Since brackets 40 and 41 are in a linear orientation along the upper and lower edges of the flat trailer surface, interior support rods 22 (which vary in length) are bent in varying amounts when positioned between brackets 40 on the upper and lower edges of the rearward face of the trailer. However, exterior support rods 18, which are essentially the same length as the distance between brackets 41, are essentially straight along the side edges of the rearward face of the trailer. This arrangement causes flexible panel 10 to assume a cone-shaped configuration extending from the rearward face of the trailer. In this configuration, the rearward face of the trailer acts as the base of the cone formed by flexible panel 10, as shown in FIG. 4.

Through a cutaway section of panel 10, the doors 53 of trailer 50 can be seen, as can the curved interior support rods 22. When panel 10 is fitted to trailer 50, access to doors 53 is essentially prevented. However, panel 10 can be partially or completely removed to allow access to doors 53, when required.

Figure 5:
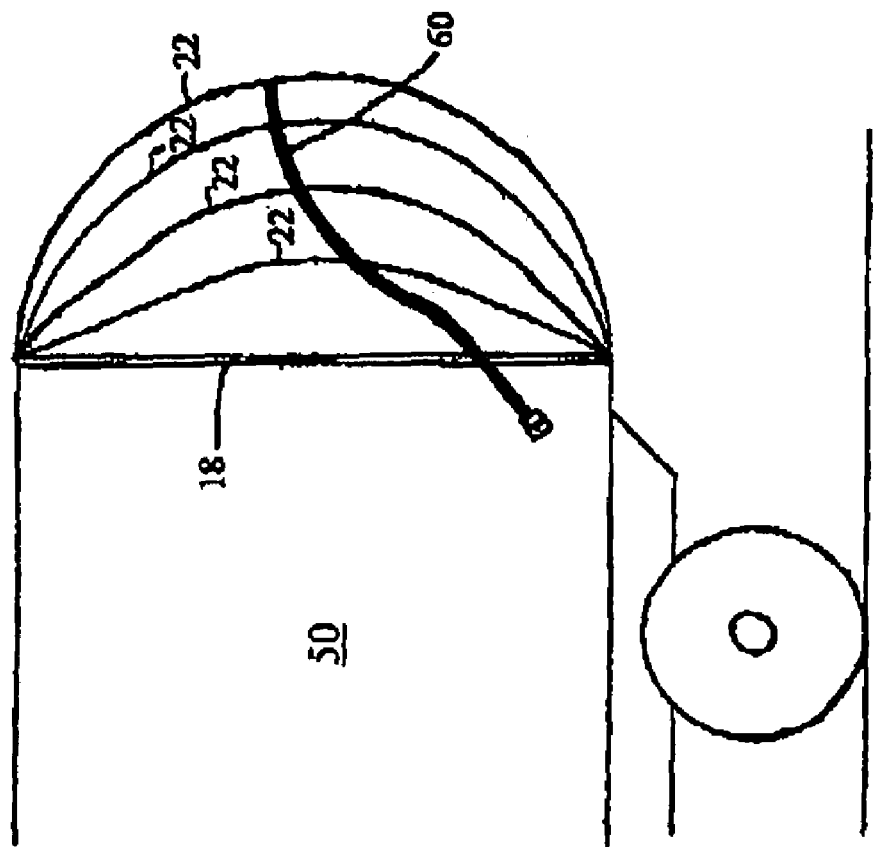
FIG. 5 is a side view of the system shown in FIG. 4.

In FIG. 5, a side view of a trailer 50 is shown having a panel 10 fitted to its rearward facing surface. End support rod 18 is essentially closely fitted to the end of trailer 50, and interior support rods 22 assume an increasingly bent orientation. Support rods 22, which are bowed under tension will thereby provide a cone section that does not sag when the trailer is not moving or is moving at slow speeds.

This can be of importance in that no additional means are required to "inflate" the cone shaped section, and prevent the flexible panel from undesirable sagging at slow speeds.

For further support, a support strap 60 is also preferably provided which is fitted around panel 10, and connected to the sides of trailer 50. Strap 60 provides additional security to ensure that panel 10 is not accidentally removed from the trailer, and can assist in maintaining tension on the flexed support rods. The ends of strap 60 can be attached to trailer 50 using any conventional means.

Figure 6:
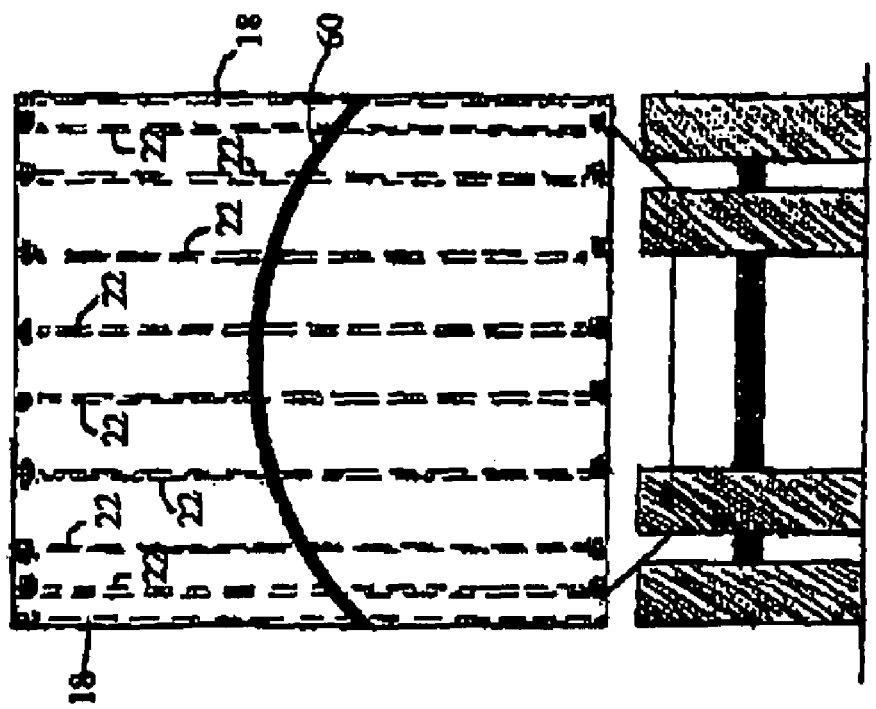
FIG. 6 is a rear top view of the system shown in FIG. 4.

In FIG. 6, a rear view, and in FIG. 7, a top view, of panel 10 from FIG. 5 is shown, which provides additional details on the fabrication and use of the flexible panel of the present invention.

As previously indicated, preferably, the flexible panel is symmetric about its vertical and horizontal axis. Preferably, the vertical axis of symmetry aligns, when installed on the trailer, with a centre vertical axis of the trailer. As a result, the support rods are symmetrically positioned, on the flexible panel, with the centre vertical axis of the trailer. This is clearly seen in FIGS. 6 and 7.

Also, a key feature of the system of the present invention is that the flexible panel can be easily and quickly positioned on the trailer, or removed therefrom. In a preferred application, flexible panel 10 is fitted with support rod slots 20 which are sewn into the woven or sheet portion of the panel. Support rods 18 or 22 are fitted within slots 20 for use.

Slots 20 can be open so that support rods 18 or 22 can be easily removed, but preferably, slots 20 are tightly fit around support rods 18 and 22 to hold flexible panel 10 in place on the support rods. A preferred construction technique would be to attach one ferrule 30 or 32 to one end of support rod 18 or 22, insert the opposite end of the support rod through slot 20, and then attach another ferrule 30 or 32 to the opposite end. Using this technique, support rods are not easily removed from the flexible panel without removing at least one ferrule.

While the support rods are preferably fitted within slots 20 formed within the fabric of panel 10, the "slots" might be provided in a number of different fashions including, for example, provision of a series of belt "loop" type attachment points connected to the flexible panel. These might be sewn to panel 10, or attached using means such as Velcro fasteners or the like.

When not in use, flexible panel 10 can be removed from the trailer, and merely rolled along its horizontal axis to provide a rolled-up storage configuration. The rolled-up panel can then be stored in a tube, or the like, fitted to the truck or some other convenient storage location. In this configuration, it is preferred that all exterior and interior support rods are straight when not in use, so as to allow flexible panel 10 to be rolled into the smallest configuration possible with this arrangement.

In FIG. 8, a side view of a modified support rod 23 is shown having ferrules 32 attached. Normally, support rod 22 is straight, but in FIG. 8 support rod 23 is shown in a slightly curved configuration. This can provide easier installation on the trailer.

One disadvantage of the storage of the straight support rod 22, or the bent support rod 23, is that the overall length of the rolled panel would be 5 metres. To decrease this storage length, support rod 22, or 23, can be replaced by a modified support rod 22A shown in FIG. 9, having a series of shorter rod sections 56, made of, for example, the same types of materials as support rods 22. These shorter rod sections 56 can be connected together by one or more hinges 58 which allow the overall length of support rod 22A to be maintained at 5 metres, in its longest form, but allow it to be bent to a shorter length. As such, when not in use, support rods 22A can be bent to allow the overall length of the flexible panel to be decreased. In a preferred application, support rods 22A are configured so that hinges 58 in each of the support rod fitted to the trailer, are horizontally align, so that flexible panel 10 can be folded into 2 or more shorter sections. This shorter, folded flexible panel can then also be rolled-up along the horizontal axis, and the shorter rolled panel is more easily stored in a storage tube fitted on the truck or trailer, for example.

An alternative design is shown in FIG. 10, wherein support rod 22 has been replaced by a modified support rod 22B having a plurality of short hollow rod sections 59, which are preferably constructed of a material such as hollow carbon fibre tubing material, but might also be constructed of any other suitable material. A shock cord (or any other suitable flexible and preferably elastic cord such as a "bungee" cord) is connected to one ferrule 32, passed through the hollow sections of a number of hollow rod sections 59, and then connected to a second ferrule 32. In this fashion, a series of identical rod sections 59 can be used to produce support rods 22B of different length simply by using a different number of rod sections. Preferably, one end 63, of rod section 59 is tapered to fitted within the corresponding opposite end of an adjacent rod section, which opposite end can be enlarged to partially receive tapered end 63. The shock cord 61, shown in an enlarged extended view in FIG. 11, provides sufficient resiliency and flexibility to support rod 22B to allow its use in flexible panel 10. There is sufficient tension in shock cord 61 to hold rod sections 59 together in a straight line, when support rod 22B is not being used. The tension from shock cord 61 still, however, allows support rod 22B to be bowed when used on trailer 50, and then to be bent to allow flexible panel 10 to be more easily be folded for storage.

In an additional feature, shown in FIG. 12, the top and optionally the bottom edges of the trailer flat surface are fitted with a flap 72 or air foil which is adapted to reduce or eliminate air flow between the trailer and the inside of the cone-shaped flexible panel. Flap 72 is fitted to the top surface of trailer 50, and extends over the edge of rearward facing surface so as act as a barrier to air entering behind flexible surface 10. Flap 72 is preferably flush with the top surface of trailer 50, and is held in contact with flexible panel 10 by a spring 70.

Similarly, a spring loaded flap can be provided on the bottom edge of the rearward facing surface of trailer 50. The side edges might also be protected in this fashion, but typically, the exterior support rods 18 provide this function. Additionally, panel sections 12 can be connected to trailer 50 to provide additional resistance to air infiltration into the cone-shaped section.

The flaps might also be fitted to, or attached to, the brackets.

Flexible panel 10 can be made of a translucent or transparent material, or have different parts of different materials, for direct view of illumination lights, or the like. Moreover, the flexible panel itself can be provided with illumination means, such as lights or reflectors, for facilitating identification of the cone-shaped panel. Also, flexible panel 10 provides a suitable vehicle for displays such as advertisements or the like.

Additionally, it is noted that locking mechanisms can also be provided to hold the support rods within the brackets. This prevents unauthorized removal of the rods from the brackets, and provides additional security to the trailer access doors.

Thus, it is apparent that there has been provided, in accordance with the present invention, a vehicle air drag reduction system and apparatus which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Also, while this discussion has addressed prior art known to the inventor, it is not an admission that all art discussed is citable against the present application.

I claim:

1. A vehicle air drag reduction system for mounting on the rearward surface of a vehicle, wherein said rearward surface of said vehicle on which said system is to be mounted, is substantially flat and rectangular, with opposed vertically disposed side edges and opposed horizontally disposed upper and lower edges, said vehicle air drag reduction system comprises:
   a flexible panel to be affixed to said rearward surface, and extending, in use, essentially between said disposed side edges and essentially between said upper and lower edges, and having two exterior support rod passages, and at least one interior support rod passage positioned between said exterior support rod passages, all of which support rod passages extend from one edge of said flexible panel to an opposite edge thereof;
   two exterior support rods, and at least one interior support rod, each of which are essentially parallel to each other, and are positioned, in use, as to be vertically orientated to the ground, and are positioned substantially within said exterior or interior support rod passages respectively, so as to provide structural support for the flexible panel, and each having a support rod end fitting protruding from said support rod passages at each end of said support rod passage;
   a series of support rod brackets affixed to said vehicle in a substantially linear fashion on opposing edges of said vehicle, and in corresponding alignment with said support rod passages, into which brackets said support rod ends are fitted;
   and wherein said interior support rods are longer in length than said exterior support rods such that said interior support rods, and thus said flexible panel, are bowed, in use, to form a cone-shaped panel.

2. A system as claimed in claim 1 wherein said vehicle is one of a truck, a truck trailer, a trailer, a bus, a motorized recreational vehicle, a recreational trailer, a cargo trailer, a transport trailer, a cube van, a van, a mini-van, a container, a piggyback truck trailer, and a train.

3. A system as claimed in claim 1 wherein said flexible panel has a circular, truncated circular, oval, or a truncated oval shape.

4. A system as claimed in claim 1 wherein said flexible panel is constructed of canvas, plastic such as PVC or nylon, or a tarp woven from fibres from materials such as cotton, plastic, polyester, or nylon, or combinations thereof and therebetween.

5. A system as claimed in claim 1 wherein said flexible panel is symmetrical round a vertical axis and is symmetrical around a horizontal axis.

6. A system as claimed in claim 1 comprising between 4 and 8 interior support rods.

7. A system as claimed in claim 1 wherein said interior or exterior support rods are resiliently flexible, and said exterior support rods are manufactured from metal such as steel or aluminum, or a plastic material, and said interior support rods are manufactured from metal, plastic materials such as graphite, fibreglass or carbon fibre, or extruded plastic materials such as polyethylene or polypropylene, or combinations thereof and therebetween.

8. A system as claimed in claim 1 wherein said exterior support rods are, in use, in substantive contact with said vehicle, along their length.

9. A system as claimed in claim 8 wherein said interior support rods are longer than said exterior support rods, and increase in length as one moves from said exterior support rods towards a centre axis of the flexible panel.

10. A system as claimed in claim 1 wherein each of said exterior and interior support rods comprises a ferrule at each end of said support rod, which ferrule is adapted to be fitted within a support rod bracket.

11. A system as claimed in claim 1 wherein said support rod brackets are positioned at the upper and lower edges of the rearward face of said vehicle.

12. A system as claimed in claim 1 additionally comprising a flexible panel support strap fitted around, and connected to said panel, and connected to the opposing sides of said vehicle.

13. A system as claimed in claim 1 wherein said interior and exterior support rod passages are enclosed passageways which are sewn into said flexible panel, and said interior and exterior support rods are fitted within said slots.

14. A system as claimed in claim 1 wherein said exterior or interior support rods comprise a series of shorter support rod sections connected together by one or more hinges.

15. A system as claimed in claim 14 wherein each of said exterior and interior support rods comprise a series of shorter support rod sections connected together by one or more hinges, and said hinges on all support rods are horizontally aligned.

16. A system as claimed in claim 1 wherein said exterior or interior support rods comprise a series of shorter, hollow support rod sections, and which sections are connected together by a flexible, elastic cord passing through the centre of each hollow section.

17. A system as claimed in claim 16 wherein said flexible, elastic cord is a shock cord.

18. A system as claimed in claim 16 wherein said shorter, hollow support rod sections are fabricated from carbon fibre tubing.

19. A system as claimed in claim 16 wherein each of said shorter, hollow support rod sections has at least one tapered end.

20. A system as claimed in claim 1 additionally comprising a flap, fitted to said bracket or said vehicle, to reduce the air flow between said vehicle and inside of said flexible panel.

21. A flexible panel structure for use on a vehicle air drag reduction system, which is to be mounted on the rearward surface of a vehicle, wherein said rearward surface of said vehicle on which said system is to be mounted, is substantially flat and rectangular, with opposed vertically disposed side edges and opposed horizontally disposed upper and lower edges;

said flexible panel panel structure being adapted to be affixed to said rearward surface, and extending, in use, essentially between said disposed side edges and essentially between said upper and lower edges, and comprising a flexible panel;

two exterior support rod passages at or near the sides of said flexible panel, and at least one interior support rod passage positioned between said exterior support rod passages, all of which support rod passages extend from one edge of said flexible panel to an opposite edge thereof:

two exterior support rods, and at least one interior support rod, each of which are essentially parallel to each other, and are positioned, in use, so as to be vertically orientated to the ground, and are positioned substantially within said exterior or interior support rod passages respectively, so as to provide structural support for the flexible panel, and each having a support rod end fitting extending out or said support rod passages at each end of said support rod passage;

and wherein said interior support rods are longer in length than said exterior support rods.

* * * * *